2,913,480
Patented Nov. 17, 1959

2,913,480

ACRYLONITRILE REACTION PRODUCT

Samuel Allen Heininger and Gail H. Birum, Dayton, Ohio, assignors to Monsanto Chemical Company, St. Louis, Mo., a corporation of Delaware No Drawing. Application February 21, 1957
Serial No. 641,474

3 Claims. (Cl. 260—465.7)

This invention provides novel compositions of matter obtained by the reaction of alkanesulfenyl halides with acrylonitrile.

Acrylonitrile is known to be resistant to reaction with sulfenyl halides. Thus, e.g., as reported by Kharasch and Buess, J. Am. Chem. Soc. (1949), vol. 71, page 2726, first column, whereas adducts of dinitrobenzenesulfenyl chloride with a number of different olefinic compounds have been prepared successfully by these workers, they found it impossible to effect the reaction of this sulfenyl halide with acrylonitrile. Turner and Connor, J. Am. Chem. Soc. (1947), 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our own experiments have confirmed this finding that nitrobenzenesulfenyl halides do not react with acrylonitrile under conditions normally leading to adduct formation when the sulfenyl halide is contacted with other olefins. We have further made repeated fruitless attempts to react acrylonitrile with perchloromethyl mercaptan, a sulfenyl halide of the formula $Cl_3CSCl$, which is known to be highly reactive and to undergo ready reaction with a variety of unsaturated organic compounds.

It is accordingly surprising that as has now been found, acrylonitrile reacts readily with alkanesulfenyl halides to form complex reaction products consisting of compounds containing sulfur atoms and nitrile radicals.

The presently preferred class consists of alkanesulfenyl chlorides and bromides containing up to 6 carbon atoms, e.g., methanesulfenyl chloride, methanesulfenyl bromide, ethanesulfenyl chloride, n-propanesulfenyl chloride, isopropane sulfenyl chloride, n-butanesulfenyl chloride, t-butanesulfenyl chloride, pentane-sulfenyl bromide, hexanesulfenyl chloride, etc.

The present reaction products are believed to be mixtures of 2-halo-3-(alkylthio)propionitriles, 3-halo-2-(alkylthio)propionitriles, i.e., compounds of the formula

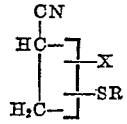

wherein X is chlorine or bromine and R represents a lower alkyl radical, and the dehydrohalogenation products thereof. The reaction mixture components are difficult to separate, but the presently provided complex reaction products are of intrinsic utility, e.g., as microbiological toxicants, etc.

The presently provided novel reaction products are obtained by simply contacting the alkanesulfenyl halide with the acrylonitrile until the reaction is complete. The present reaction, whereby there is formed a complex mixture of sulfur-containing nitriles, consumes approximately equimolecular amounts of the sulfenyl halide and the nitrile; an excess of the more readily available component may be used if desired to serve, e.g., as a reaction diluent. The rapidity of reaction varies depending on the reactants chosen, and diluents and/or cooling may be required to moderate the violence of the reaction in some cases, while other pairs of reactants may not be completely reacted until after a period of refluxing at elevated temperatures. Suitable inert solvents and diluents which may be employed in the reaction mixture, if desired, include hydrocarbons such as benzene, toluene, or hexane; halogenated solvents such as chloroform, carbon tetrachloride, ethylene dichloride, o-dichlorobenzene, or ethylene dibromide; oxygenated solvents free of active hydrogen, such as ether or dioxane, etc. A particularly preferred class of solvents are anhydrous, organic carboxylic acids such as glacial acetic acid; this solvent also has the advantage of acting as a catalyst for the reaction. Mixtures of glacial acetic acid and an inert solvent such as ethylene dichloride or benzene may also be used as the reaction medium if desired.

The use of catalysts is generally not necessary, although acid catalysts may advantageously be employed to accelerate the reaction rate in some cases. Exemplary of acid catalysts which may be used in the present reaction in addition to the organic carboxylic acid catalysts mentioned above are, e.g., Friedel-Crafts catalysts such as aluminum trichloride or boron trifluoride complexes. Pressure variation may also be utilized to facilitate the conduct of the reaction, e.g., by carrying out the reaction in a pressure-resistant vessel under autogeneous pressure at elevated temperatures.

Since acrylontrile is susceptible to thermal polymerization, the reaction is preferably conducted in the presence of polymerization inhibitors. Examples of suitable polymerization inhibitors are, e.g., hydroquinone, the monomethyl ether of hydroquinone, methylene blue, copper carbonate, selenium dioxide, etc.

The time required to accomplish the reaction depends on functional factors such as the reactivity of the $\alpha,\beta$-olefinic nitrile and the sulfenyl halide, the temperature of reaction, the presence or absence of catalysts, etc. Reaction rates and times of reaction may vary considerably, depending on details of apparatus and other operational conditions. By modification of the apparatus, continuous procedures may be substituted for the batch-type operation described below.

Conveniently, the course of reaction may be followed by observing the change in color of the reaction mixture. Sulfenyl halides are generally a deep red shade; as the reaction with the nitrile proceeds, the color of the reaction mixture gradually lightens, usually reaching a clear yellow or orange tone by the time all the sulfenyl halide is reacted. On completion of the reaction, the product may be isolated by conventional methods, e.g., by evaporation of any solvents, by washing and/or decantation to remove unreacted nitrile or sulfenyl halide, etc.

The following procedure is illustrative of the method of obtaining reaction products in accordance with this invention.

Methanesulfenyl chloride is prepared by the gradual addition of 94 g. (1.0 mole) of dimethyl disulfide in 200 ml. of carbon tetrachloride to a cooled solution of 72 g. of chlorine in 500 ml. of carbon tetrachloride. The reaction proceeds through the formation of $CH_3SCl_3$, a white precipitate which redissolves on continued addition of dimethyl disulfide. On completion of the addition of the disulfide to the chlorine solution, the solution of methanesulfenyl chloride is a clear, bright red-orange color.

The cooling bath is removed from this solution of methane-sulfenyl chloride and the addition of acrylonitrile is begun. At above 20° C., the reaction becomes exothermic; the temperature of the solution is then held below 30° C. by intermittent cooling, until a total of 2.5 moles (132.5 g.) of acrylonitrile has been added. When all the acrylonitrile has been introduced, the solution becomes a clear yellow. On distillation of the reaction mixture, there are obtained 64.0 g. of a fraction, $n_D^{25}$ 1.5135, B. 95–103° C./13 mm., which has an analysis approximating to the composition $C_4H_6ClNS$.

By comparison, 2-chloro-3-(methylthio)propionitrile, obtained by addition of methanethiol to α-chloracrylonitrile, is a liquid, B. 90–91°/10 mm., $n_D^{20}$ 1.5070 ($n_D^{25}$ 1.5050). The difference in refractive index is substantial and significant.

To the best of our knowledge, the presently provided reaction products of sulfenyl halides with acrylonitrile are complex mixtures of isomeric saturated and unsaturated compounds. The constituents are difficultly separable, and the composition of the present reaction mixtures has not been precisely established. The reaction products have fungicidal and bactericidal properties and are useful as constituents of microbiological toxicant compositions. This utility is illustrated by tests wherein concentrations of 0.1% of the reaction product of methanesulfenyl chloride with acrylonitrile were introduced into hot sterile agar, and the agar was cast into plates, cooled and hardened, and inoculated with *Micrococcus pyogenes* var. *aureus*, *Salmonella typhoss* and *Aspergillus niger*.

This concentration of the test chemical gave 100% control of each of these organisms during incubation of the plates for from 2 to 5 days. Further testing at 0.01% concentration showed 100% control of *Salmonella typhosa* at this concentration.

The reaction products of this invention can be used as preservatives, for example, in leather, paper, and fabrics, or in paints and varnishes to render them proof against mildew or other fungus attack.

The present reaction products may further be used as nematocides, insecticides, herbicides, etc. They are also of utility as chemical intermediates, and may, for example, be reacted with trialkyl phosphites to produce phosphonyl compounds of utility as bioligical toxicants, oil additives, etc.

It is also contemplated that the presently provided sulfur-containing reaction products of acrylonitrile with alkane-sulfenyl chlorides may be converted by oxidation (e.g., with hydrogen peroxide in acetic acid, potassium permanganate, chromic acid, etc.) into the corresponding sulfoxides and sulfones.

While the present reaction and the products thereof have been described with reference to particular procedures and compositions, the invention may be otherwise variously embodied within the scope of the appended claims.

What is claimed is:

1. The reaction product of equimolecular amounts of acrylonitrile, and an alkanesulfenyl halide of the formula RSX, where R represents a lower alkyl hydrocarbon radical, and X is selected from the class consisting of chlorine and bromine, said reaction product comprising mixtures of compounds of the formula

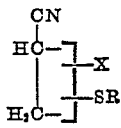

wherein X and R are as defined hereinabove.

2. The reaction product of equimolecular amounts of acrylonitrile and methanesulfenyl chloride, said reaction product comprising mixtures of compounds of the formula

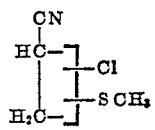

3. The reaction product of equimolar amounts of acrylonitrile, and an alkanesulfenyl chloride of the formula RSCl, where R represents a lower alkyl hydrocarbon radical, and said reaction product comprising mixtures of compounds of the formula

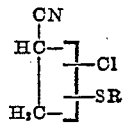

wherein R is as defined hereinabove.

References Cited in the file of this patent

UNITED STATES PATENTS

| | | |
|---|---|---|
| 2,568,859 | Ladd et al. | Sept. 25, 1951 |
| 2,725,411 | Ladd et al. | Nov. 29, 1955 |

OTHER REFERENCES

Brintzinger et al.: Angew. Chemie, vol. 64, p. 398 (1952).

Brintzinger et al.: Ber. Deut. Chem., vol. 87, pp. 320–30 (1954), p. 328 relied on.